US010866791B2

(12) United States Patent
Yang

(10) Patent No.: US 10,866,791 B2
(45) Date of Patent: *Dec. 15, 2020

(54) TRANSFORMING NON-APEX CODE TO APEX CODE

(71) Applicant: salesforce.com, inc., San Francisco, CA (US)

(72) Inventor: Qinghua Yang, Toronto (CA)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/547,486

(22) Filed: Aug. 21, 2019

(65) Prior Publication Data

US 2019/0377561 A1    Dec. 12, 2019

Related U.S. Application Data

(63) Continuation of application No. 15/971,117, filed on May 4, 2018, now Pat. No. 10,423,396.

(51) Int. Cl.
| | |
|---|---|
| *G06F 8/51* | (2018.01) |
| *G06F 8/30* | (2018.01) |
| *G06F 8/40* | (2018.01) |
| *G06F 8/41* | (2018.01) |

(52) U.S. Cl.
CPC .............. *G06F 8/51* (2013.01); *G06F 8/315* (2013.01); *G06F 8/40* (2013.01); *G06F 8/425* (2013.01); *G06F 8/436* (2013.01)

(58) Field of Classification Search
None
See application file for complete search history.

(56) References Cited

U.S. PATENT DOCUMENTS

| | | |
|---|---|---|
| 5,392,390 A | 2/1995 | Crozier et al. |
| 5,768,564 A | 6/1998 | Andrews et al. |
| 6,279,150 B1 | 8/2001 | Bachmann et al. |
| 6,467,079 B1 | 10/2002 | Ettritch et al. |
| 6,516,461 B1 | 2/2003 | Ichisugi et al. |
| 9,189,211 B1 | 11/2015 | Nicholson et al. |
| 9,317,266 B1 | 4/2016 | Muldoon et al. |
| 2003/0226132 A1 | 12/2003 | Tondreau et al. |
| 2004/0103405 A1 | 5/2004 | Vargas et al. |
| 2007/0226708 A1 | 9/2007 | Varma et al. |
| 2008/0216060 A1 | 9/2008 | Vargas et al. |
| 2009/0313613 A1 | 12/2009 | Ben-Artzi et al. |
| 2010/0146492 A1 | 6/2010 | Shacham et al. |
| 2011/0126169 A1 | 5/2011 | Moore et al. |
| 2011/0283269 A1 | 11/2011 | Gass et al. |
| 2011/0283270 A1 | 11/2011 | Gass et al. |

(Continued)

OTHER PUBLICATIONS

United States Patent and Trademark Office, U.S. Appl. No. 15/971,117, Notice of Allowance dated May 15, 2019.

*Primary Examiner* — Qing Chen
(74) *Attorney, Agent, or Firm* — Wong & Rees LLP; Zhichong Gu

(57) ABSTRACT

Source code of a first high-level language is received and analyzed. The source code of the first high-level language is transformed into source code of a second high-level language. The source code of the second high-level language is customized to a specific organization among a plurality of organizations that are hosted in a multitenant platform. At least a portion of the source code of the second high-level language is caused to be compiled into low-level code for execution in the multitenant platform.

20 Claims, 6 Drawing Sheets

(56) References Cited

U.S. PATENT DOCUMENTS

| | | |
|---|---|---|
| 2011/0296391 A1 | 12/2011 | Gass et al. |
| 2013/0081004 A1 | 3/2013 | Vargas et al. |
| 2013/0125098 A1 | 5/2013 | Dhoolia et al. |
| 2013/0159982 A1 | 6/2013 | Lerios et al. |
| 2014/0157243 A1 | 6/2014 | Vargas et al. |
| 2015/0160934 A1 | 6/2015 | Beit-Aharon et al. |
| 2015/0242194 A1 | 8/2015 | Vargas et al. |
| 2018/0165067 A1 | 6/2018 | Souza et al. |

TRANSFORMING NON-APEX CODE TO APEX CODE

CROSS-REFERENCE TO RELATED APPLICATIONS

This application is a Continuation of U.S. patent application Ser. No. 15/971,117 (now U.S. Pat. No. 10,423,396) filed on May 4, 2018, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to software executed by computing processors, and in particular, to transforming non-Apex code such as JavaScript code to Apex code that is optimized for security, transactional context, and performance on a multitenant enterprise platform.

BACKGROUND

A multitenant enterprise platform may include multiple datacenters at various geographic locations to maintain application data for a large number of organizations as well as provide application services for customer relationship management (CRM), secured data access, online transaction processing, mobile apps, etc., to respective users and/or customers of these organizations.

A high-level programming language such as JavaScript may be widely used in World Wide Web related software engineering, as many application developers are familiar with developing applications in JavaScript. However, even though JavaScript code can be written relatively easily and fast, it is difficult for such JavaScript code to take advantage of domain-specific (e.g., unique, specifically implemented, etc.) characteristics, benefits, services, facilities, and so forth, inherent to a multitenant enterprise platform.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
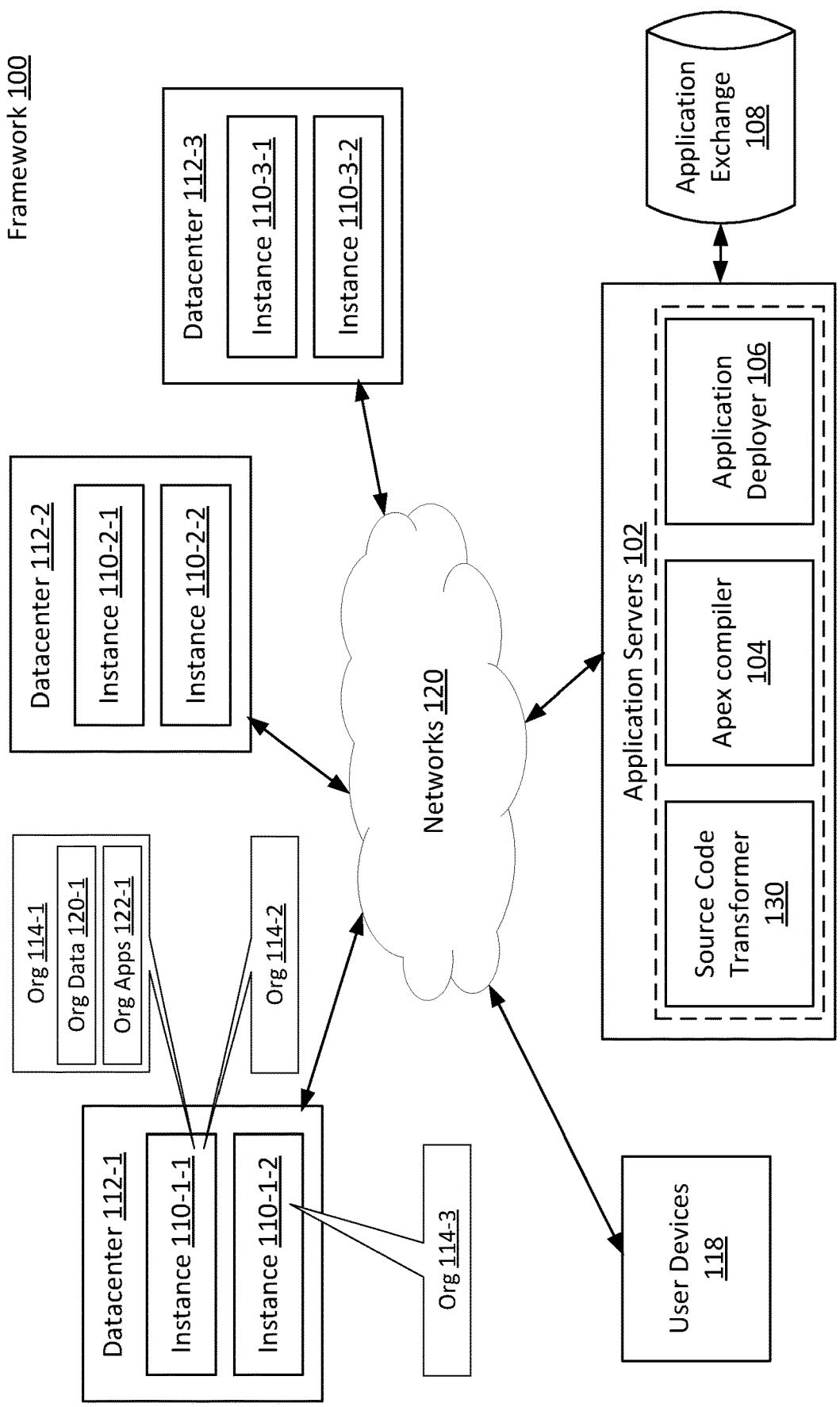
FIG. 1 illustrates an example multitenant source code transformation framework 100 in a cloud-based computing system.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1 Source Code Transformation System Configuration
   2.2 Application/Service Deployment
   2.3 Source Code Transformation Examples
3.0. Example Embodiments
4.0 Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used to leverage the best of the two worlds of non-Apex high-level programming languages such as JavaScript and a high-level programming language hosted on a multitenant enterprise platform such as Apex. Source code can be written in the non-Apex programming languages, fully taking advantage of features (e.g., modern language features such as arrow functions, destructuring assignment, modules, etc.) of, and tools available for, the non-Apex programming languages. The non-Apex source code can then be transformed (e.g., automatically, substantially automatically, with minimal or no code re-writing in the second high-level programming language, etc.) Apex source code to fully take advantage of domain-specific features and tools available for Apex as a hosted language of the multitenant enterprise platform.

A source code transformer for transforming non-Apex source code to Apex source code can be implemented in a way that is progressively and/or closely adaptive to developments of both new non-Apex language features and new Apex language features. Thus, the source code transformer can be used to help Apex avoid playing a catching-up game against non-Apex language features or reinventing the wheel in building similar tools against non-Apex language features.

Application developers are free to use available tools and language features of the non-Apex programming languages in writing non-Apex code for programs, applications, classes, methods, APIs, expressions, operators, etc. The non-Apex source code can then be transformed into Apex as a hosted language of the multitenant enterprise platform to fully exploit and optimize for domain-specific (e.g., unique, specifically implemented, etc.) characteristics, benefits, services, facilities, and so forth, of the multitenant enterprise platform.

In the meantime, Apex platform developers can focus on a vision of, spend resources and efforts on, building a better domain-specific high-level programming language optimized for the multitenant enterprise platform.

It should be noted that techniques as described does not preclude handwriting some or all source code (e.g., Apex code, etc.) in the second high-level programming language. Rather, in various embodiments, application developers are enabled to freely choose to write programs/applications in any of: Apex only, one or more non-Apex high-level programming languages only, a combination of the foregoing, and so forth.

A hosted language such as Apex can play a relatively important role in differentiating a multitenant enterprise platform as described herein from other platforms. Apex is purposely designed to be a domain-specific hosted language optimized for security, transactional context and performance in connection with the multitenant enterprise platform, and thus can, but is not limited to, evolve independently with the evolution of non-Apex language features in non-Apex programming languages such as Java, JavaScript, etc.

Given divergences in visions, directions, language features and development speeds between Apex and the non-Apex programming languages, there would likely exist a large or small gap between what Apex offers and what application developers used to develop non-Apex source code may be accustomed to.

Techniques as described herein can be used to effectively close this gap fully or at least to a great extent, thereby significantly improving productivities of both application developers and platform developers. As used herein, application developers may refer to, without limitation, any of: developers working at a specific organization, developers working to create applications available in an application store, third-party developers, application developers of the multitenant enterprise platform, etc. Platform developers may refer to, without limitation, any of: internal developers for the hosting entity that owns the multitenant enterprise platform, internal developers for the source code transformer, internal developers for the Apex compiler, internal developers for other services of the multitenant enterprise platform, etc.

As the non-Apex programming languages may continuously or sporadically evolve in directions independent of the multitenant enterprise platform, possibly even at a relatively fast pace, source code transformation techniques as described herein can be used to effectively bridge the differences between Apex and the non-Apex programming languages, to enable application developers to write program/application source code with relatively up-to-date language features in the non-Apex programming languages, to generate transformed Apex source code from the Non-Apex source code, and run the transformed Apex source code. This frees (or at least delays until a later time) Apex from closely following language features made available in the non-Apex programming language.

The source code transformer may incorporate up-to-date Apex best practices (which may be overlooked by relatively less experienced and even experienced Apex developers) in a source code transformation process. The source code transformation process may be used to produce the best possible Apex code (e.g., mature and solid code, better code than typical handwritten Apex code, etc.) from non-Apex source code, to optimize the Apex code for the multitenant enterprise platform, to leverage security, transactional context, and performance on the multitenant platform, and so forth.

Furthermore, as the source code transformation process can be performed automatically with no or little human supervision, source code transformation techniques as described herein provide a relatively fast way to produce Apex code by a large population of application developers that include those not familiar with Apex. With the language features and tools available in the non-Apex programming languages, it might be relatively fast for application developers to avoid or reduce writing (e.g., handwriting, etc.) Apex source code directly, instead to write (e.g., handwrite, etc.) program/application code in the non-Apex programming languages, and then to compile the non-Apex source code to Apex source code.

The source code transformer can be provided locally on a user device or remotely as a platform based/provided tool. In a non-limiting implementation example, the source code transformer may be offered as an application/service on the multitenant enterprise platform to some or all organizations (e.g., companies, firms, corporations, startups, enterprises, etc.) hosted in the cloud-based computing system, thereby enabling these organizations with possibly ample non-Apex development resources to start building better web services on the multitenant enterprise platform in the cloud-based computer system with minimum dedicated Apex development resources. The source code transformer can be used to encourage these organizations with non-Apex development resources to be hosted in the cloud-based computing system, to build their organization-specific and/or organization-common services, applications, programs, etc., with the multitenant enterprise platform, and to immediately take advantage of security, transactional context, performance, and other characteristics/benefits/features/services, as provided by the multitenant enterprise platform including but not limited to cloud-based multitenant secure database services. Thus, the source code transformer can be used as a creative ramp for application/service development teams of these organization with or without dedicated Apex development resources to start using and adapting to the multitenant enterprise platform relatively promptly with high quality.

For example, the source code of the first high-level programming language may be written without program logic to handle security and sharing rules (implemented/enforced on the multitenant enterprise platform) that specify which data objects (e.g., custom data objects, etc.) a particular user has been given permissions to create, view, or edit; which instances of those and other objects (e.g., standard data objects, custom data objects, etc.) the particular user has been given permissions to create, view, or edit; which data fields in data objects (e.g., standard data objects, custom data objects, etc.) the particular user has been given permissions to perform data query operations or data manipulation operations.

Under techniques as described herein, the transformed source code of the second high-level programming language includes program logic represented in the source code of the first high-level programming language as well as additional program logic to enforce the security and sharing rules as enforced/implemented on the multitenant enterprise platform to allow a user who runs low-level code compiled from the transformed source code of the second high-level programming language to access and operate on subsets of data objects, data instances, data fields, and so forth, for which the user has been given applicable data access permissions.

Non-Apex source code can be agnostic to organizations and users. However, Apex source code transformed from the JavaScript source code as compiled, interpreted and/or executed on the multitenant enterprise platform is organization specific, customized to the organization of a runtime user, accessing data owned by the organization, validating access rights/permissions of the users in the organization, preventing other hosted organizations from accessing application data and application services of the organization, enforcing platform resource sharing by implementing governor limits (or Apex limits) to various operational types, generating or caching bytecodes for efficient execution, deploying custom data object for the organization, and so forth.

Non-Apex source code (e.g., JavaScript code, etc.) may use a common name for a standard data object (e.g., Account, etc.). Low-level code generated from transformed Apex source code generated from the non-Apex source code is runnable to access organization-specific data instances of the standard data object.

Non-Apex source code (e.g., JavaScript code, etc.) may use a wildcard reference to all fields in a data object. Low-level code generated from transformed Apex source code generated from the non-Apex source code is runnable to identify or generate a different set of fields in the data object for a different user of an organization, based on identity and access management (IAM) rights such as user security settings, data access permissions for users based on one or more of: user-specific profiles, user-specific permission sets, user-specific roles, specially granted permissions, and so forth.

Additionally, optionally or alternatively, transformed Apex source code generated from the non-Apex source code can incorporate program logic to deploy one or more custom data object defined in the non-Apex source code. These custom data objects can be used or accessed by not only a user running the low-level code compiled from the transformed Apex source code, but also other users of the organization with sufficient IAM rights.

Additionally, optionally or alternatively, transformed Apex source code generated from the non-Apex source code can incorporate program logic to implement or enforce governor limits (or APEX limits) to ensure fair platform-wide resource sharing among all users, among all hosted organizations in an instance of a datacenter, among all hosted organizations on the multitenant enterprise platform in the cloud-based computing system, and so forth.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1 illustrates an example multitenant source code transformation framework 100 in a cloud-based computing system. Example computing systems that implement the multitenant source code transformation framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents (e.g., including but not limited to user devices 118, etc.) may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc. Some or all of the application data of an individual organization may be specifically generated or configured for (e.g., organization-specific, organization-common, etc.) application services of that organization.

As used herein, the term "organization" may refer to some or all of application data of an organization hosted in the computer system and application services of the organization based at least in part on the application data.

As illustrated in FIG. 1, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1, the system instance (110-1-1) in the datacenter (112-1) may host a first organization 114-1 and a second organization 114-2, among others; the system instance (110-1-1) in the datacenter (112-1) may host a third organization 114-3, among others.

The source code transformation framework (100) can be used to transform source code written in a first high-level programming language (e.g., JavaScript, a general-purpose programming language, etc.) that is not specifically defined or created for taking advantage of domain-specific characteristics, benefits, services, facilities, and so forth, of (e.g., inherent to, etc.) a multitenant enterprise platform as provided in the cloud-based computer system to source code of a second high-level programming language (e.g., Apex, etc.) that is specifically defined or created for (e.g., fully, completely, to a great extent, etc.) taking advantage of these domain-specific characteristics, benefits, services, facilities, and so forth, of the multitenant enterprise platform. The first high-level programming language may be, but is not necessarily limited to only, JavaScript. The second high-level programming language may be, but is not necessarily limited to only, Apex.

Examples of the domain-specific characteristics, benefits, services, facilities, and so forth, of the multitenant enterprise platform—of which the second high-level programming language is specifically created for taking advantage—may include, but are not necessarily limited to only, some or all of: a security and sharing mechanism on the multitenant enterprise platform to finely control a user's access to different data, secure transactional processing on the multitenant enterprise platform, performance (e.g., efficient bytecode, caching facilities, Apex runtime interpreter and execution engine, process spaces for safely executing system and tenant processes, etc.), autoboxing, SOQL, properties, comparisons, modifiers, code coverage mechanisms, sharing mechanisms, a wide varieties of existing applications, a library of components, building-blocks, pre-built components for feeds, profiles, conversations, updates, file sharing, components available through REST APIs, secure cloud databases, data-centric applications to control, access and manage data, collaborative application with data and services shared by multiple users in different locations, workflow rules to automatically assign tasks, update data or send e-mail alerts when certain events occurs such as the creation of a new record or a change in the value of a record field, application models in which all users and application in an organization share a single, common infrastructure and code base, accessing data models, objects, forms, workflows, etc., as defined by metadata, using or integrating with a specific organization's data through SOAP API and REST API, using RESTful Bulk API to load or delete large numbers of records, using metadata API to manage customizations in a specific organization, using messaging REST APIs to access message/discussion feeds and social data, interoperating with a framework to create feature-rich user interfaces for applications in the cloud, deployment mechanisms to make available an application to a specific organization or in an application store/directory (e.g., AppExchange commercially available from Salesforce.com, San Francisco, Calif., etc.), and so forth.

By way of illustration but not limitation, the first high-level programming language may be JavaScript, and the second high-level programming language may be Apex.

As depicted in FIG. 1, the cloud-based computing system may comprise one or more application servers 102, each of which may be implemented with one or more computing devices. Each of some or all of the application servers (102) may comprise software, hardware, and so forth, to serve as a front-end of the cloud-based computing system in relation to one or more user devices 118 and to handle user requests from the user devices (118). Some or all of these user requests are for users (e.g., application developers, end users, employees, customers, authorized users, designated users, etc.) of organizations hosted in the cloud-based computer system. Each of some or all of the application servers (102) as illustrated in FIG. 1 may comprise a source code transformer (e.g., 130, etc.), an Apex compiler (e.g., 104, etc.), an application deployer (e.g., 106, etc.), and so forth.

In some embodiments, an application developer can use an application development tool (e.g., a text editor, a GUI frontend application of an integrated development environment or IDE, etc.) running on a user device (e.g., one of user devices 118, etc.) to develop (e.g., write, etc.) JavaScript source code for a program/application to be deployed on the multitenant enterprise platform in the cloud-based computing system. Examples of user devices may include, but are not necessarily limited to only, any of: a mobile device, a laptop computer, a personal computing device, a mobile device, a tablet computing device, a mobile phone, a workstation, and so forth. The JavaScript source code for the program/application in the source code transformation request may be forwarded to the source code transformer (130).

Upon completion of the JavaScript source code, the application developer may interact with a control (e.g., a button on a GUI display, etc.) of the application developer tool to cause the user device to send the JavaScript source code in a source code transformation request (e.g., one or more messages, etc.) to an application server among the application servers (102) via the networks (120). The JavaScript source code in the source code transformation request may be forwarded to the source code transformer (130) on the application server.

In response to receiving the JavaScript source code, the source code transformer (130) can perform a source code transformation operation including but not limited to performing JavaScript source code analyses (e.g., lexical, syntactic and/or semantic analyses, etc.) on the JavaScript source code from the user device. Based on the results of the JavaScript source code analyses, an internal source code representation/structure (e.g., a concrete syntax tree, an abstract syntax tree, other internal source code representations and/or structures, etc.) may be generated for the received JavaScript source code. The source code transformer (130) can use some or all of the results of the source code analyses and/or the internal source code representation/structure to generate transformed Apex source code based on the JavaScript source code. The transformed Apex source code can be optimized to take advantage of the domain-specific characteristics, benefits, services, facilities, etc., of, etc., the multitenant enterprise platform in the cloud-based computer system.

Upon completion of the source code transformation operation, the source code transformer (130) can send a source code transformation response (e.g., one or more messages, etc.), responsive to the previously received source code transformation request, to the user device. The source code transformation response includes some or all of the transformed Apex source code transformed from the JavaScript source code.

In response to receiving the transformed Apex source code from the application server, the application development tool on the user device can display the Apex source code to the application developer for review, edit, save, and so forth. The application developer can review the transformed Apex source code, make zero or more modifications to the transformed Apex source code, approve the transformed Apex source code for Apex compilation with or without any modifications, and interact with a control (e.g., a button on a GUI display, etc.) of the application developer tool to cause the user device to send the approved Apex source code in an Apex compilation request (e.g., one or more messages, etc.) to the application server (e.g., one of the application servers (102), etc.) via the networks (120). The approved Apex source code in the Apex compilation request may be forwarded to the Apex compiler (104) on the application server.

In response to receiving the approved Apex source code, the Apex compiler (104) can perform Apex source code analyses (e.g., lexical, syntactic and/or semantic analyses, etc.) on the received Apex source code. Based on the results of the Apex source code analyses, an internal source code representation/structure (e.g., a concrete syntax tree, an abstract syntax tree, other internal source code representations/structures, etc.) may be generated for the received Apex source code. The Apex compiler (104) can use some or all of the results of the source code analyses and/or the internal source code representation/structure to generate low-level code (e.g., bytecode instructions to be interpreted by runtime interpreter, machine code to be executed by one or more computer processors, etc.) based on the received Apex source code.

In some embodiments, as Apex represents a hosted language of the multitenant enterprise platform, the low-level code generated from the received Apex source code is to be executed on the server side of the multitenant enterprise platform such as in process spaces of application servers of the cloud-based computing system. The low-level code may be saved on the server side as application data and/or metadata of an organization (e.g., 114-1, etc.) to which the application developer is a designated user for application/service development on the multitenant enterprise platform.

Subsequently, the Apex compiler (104) can send an Apex compilation response (e.g., one or more messages, etc.), responsive to the previously received Apex compilation request, to the user device. The Apex compilation response informs the user device of the Apex source code compilation results (e.g., success, failure, compilation errors, compilation warnings, etc.).

After (e.g., all, etc.) fatal errors have been successfully resolved or avoided in the source code transformation process and the Apex compilation process, the application developer may proceed to use a debugging tool (e.g., a part of the application development tool or IDE, etc.) to test the low-level code (e.g., through a runtime interpreter, a just-in-time compiler, etc.) generated from the approved Apex source code, to achieve a target (e.g., a test coverage of 75%, 90%, 100%, etc., of the low-level code, etc.) that is to be met for testing/debugging the low-level code, and, if the target is met, to save some or all of: the (e.g., handwritten, etc.) JavaScript source code, the approved Apex code used to generate the low-level code, or the low-level code, in one or more data repositories of the cloud-based computing system, for example as application data, application metadata, etc. Some or all of the JavaScript source code and the approved Apex code may be saved in the user device operated by the application developer.

After the low-level code is sufficiently tested, the application developer may determine that an application/service package including the low-level code should be generated for deployment. The application developer can interact with a control (e.g., a button on a GUI display, etc.) of the application developer tool to cause the user device to send an application deployment request (e.g., one or more messages, etc.) to the application server (e.g., one of the application servers (102), etc.) via the networks (120). The application deployment request may be forwarded to an application deployer (106) in the application server, or a cloud-based application deployment service provided by the cloud-based computing system.

In response to receiving the application deployment request, the application deployer (106), or the application deployment service, can generate an (e.g., installable, downloadable for installation, etc.) application/service package including but not limited to the low-level code, and deploy the application/service package as an organization-specific application/service or as an application/service available in a cloud-based application store for organizations hosted in the cloud-based computing system to download and install.

2.1 Source Code Transformation System Configuration

Figure 2:
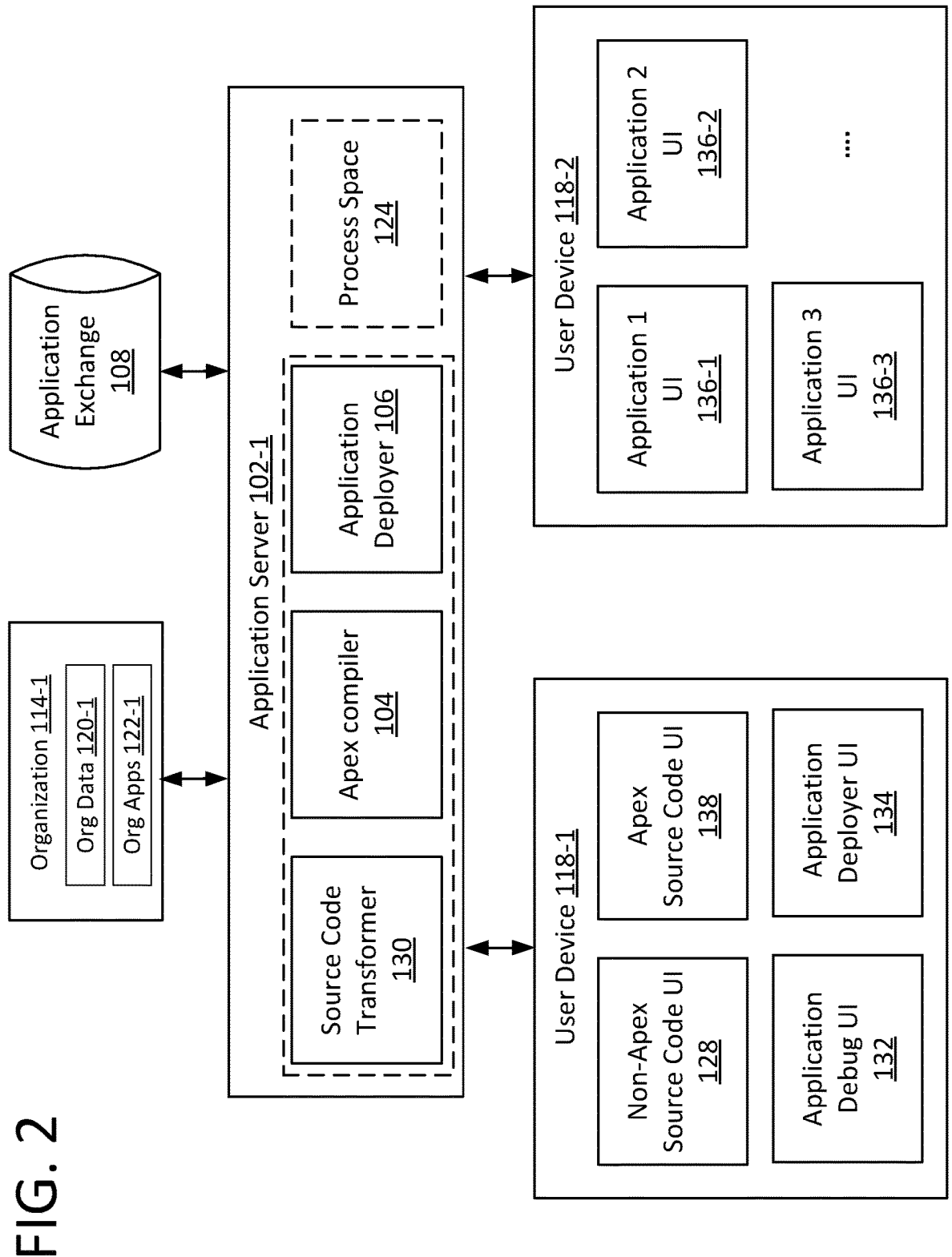
FIG. 2 illustrates an example system configuration for source code transformation.

FIG. 2 illustrates an example system configuration for source code transformation. Various system constituents may be implemented through software, hardware, or a combination of software and hardware. Any, some or all of these system constituents may be interconnected and communicated directly, or through one or more networks (e.g., 120 of FIG. 1, etc.).

As previously noted, program/application source code in the first high-level programming language may be written by an application developer using an application development tool running on a user device 118-1. The application development tool could be as simple as a text editor, a command line user interface, etc. or as sophisticated as a functionality-rich IDE tool that can operate seamlessly with a wide variety of other platform components, platform services, APIs, a cloud-based database, etc., hosted in the cloud-based computing system.

By way of example but not limitation, as illustrated in FIG. 2, the application development tool running on the user device (118-1) comprises a non-Apex source code UI 128, an Apex source code UI 138, an application debug UI 132, an application deployer UI 136, and so forth.

The non-Apex source code UI (128) may be used to as a GUI front end of the application development tool to write, edit and display application/program source code in JavaScript. The GUI front end may comprise a graphic UI component (e.g., a user clickable button, a user selectable menu item, etc.) representing a control which, when clicked on or selected by the application developer, invokes a source code transformation operation by way of sending a source code transformation request to an application server 102-1. The source code transformation request includes at least some or all of the application/program source code in JavaScript that is currently displayed in the non-Apex source code UI (128).

A source code transformer (e.g., 130, etc.), or an instance thereof, may be running on, or otherwise operating in conjunction with, the application server (102-1) to receive the source code in JavaScript and perform the requested source code transformation operation to transform the source code in JavaScript to source code in Apex (e.g., if possible, etc.). Some or all information, errors, warnings, etc., that occur in the source code transformation operation may be sent back along with the transformed source code in Apex, in a source code transformation response, to the user device (118-1). Any, some or all of the information, errors, warnings, etc., received by the user device (118-1) may be displayed in the non-Apex source code UI (128) (e.g., the lower part of the non-Apex source code UI (128), etc.) or in a separate GUI UI, frame, pane, tab, tooltips, etc.

The Apex source code UI (138) may be used to as a GUI front end of the application development tool to receive, display and edit the transformed application/program source code in Apex.

The application developer can review the source code in JavaScript, the transformed code in Apex, any received information, errors, warnings, etc., from the application server, and so forth. If the application developer determines that the latest transformed Apex code should not be used for the next step of program/application development, the application developer can continue to edit the source code in JavaScript (e.g., if necessary, etc.) in the non-Apex source code UI (128). Any edited JavaScript source code can be repeatedly submitted in new source code transformation request(s) to the application server (102-1) for the purpose of generating new transformed Apex code, and any new information, errors, warnings, etc., if any, by the source code transformer (130) until the application developer determines that the latest transformed Apex code can be used for the next step of program/application development.

For the next step of program/application development, the application developer may choose to edit the transformed Apex code, or leave the transformed Apex code alone with no or little change. Once the application developer approves the Apex code, which may be the same as the transformed Apex code or may comprise edited Apex code based on the transformed Apex code.

The Apex source code UI (138) may comprise a graphic UI component (e.g., a user clickable button, a user selectable menu item, etc.) representing a control which, when clicked on or selected by the application developer, invokes an Apex source code compilation operation by way of sending a source code compilation request to an application server 102-1. The source code compilation request includes at least some or all of the approved source code (e.g., developer-approved source code, etc.) in Apex that is currently displayed in the Apex source code UI (138).

An Apex compiler (e.g., 104, etc.), or an instance thereof, may be running on, or otherwise operating in conjunction with, the application server (102-1) to receive the source code in Apex and perform the requested Apex source code compilation operation to compile the approved source code in Apex into low-level code (e.g., if possible, etc.). The low-level code may be bytecodes that can be interpreted at runtime by Apex runtime interpreters (or just-in-time compiler). Additionally, optionally or alternatively, the low-level code may be machine codes for execution on the multitenant enterprise platform in the cloud-based computing system. Some or all information, errors, warnings, etc., that occur in the Apex source code compilation operation may be sent back in a source code compilation response to the user device (118-1). Any, some or all of the information, errors, warnings, etc., received by the user device (118-1) may be displayed in the Apex source code UI (138) (e.g., the lower part of the Apex source code UI (138), etc.) or in a separate GUI UI, frame, pane, tab, tooltips, etc.

The application developer can review the source code in JavaScript, the approved code in Apex, any received information, errors, warnings, etc., from the application server, and so forth. If the application developer determines that the approved Apex code should not be used for the next step of program/application development, the application developer can continue to edit the approved source code in Apex (e.g., if necessary, etc.) in the Apex source code UI (138). Additionally, optionally or alternatively, the application developer can go back to editing the JavaScript source code and start a new source code transformation operation if the application developer so chooses.

Any edited approved source code in Apex can be repeatedly submitted in new source code compilation request(s) to the application server (102-1) for the purpose of generating new low-level code, and any information, errors, warnings, etc., if any, until the application developer determines that the latest approved Apex code is ready for the next step of program/application development.

For the next step of program/application development, the application developer may choose to test/debug the (e.g., latest, etc.) low-level code generated from the (e.g., latest, etc.) approved Apex source code.

The Apex source code UI (138) may comprise a graphic UI component (e.g., a user clickable button, a user selectable menu item, etc.) representing a control which, when clicked on or selected by the application developer, invokes a low-level code test/debug process by way of sending a test/debug request to an application server 102-1. The test/debug request includes identification information that identifies the low-level code compiled from the approved Apex source code.

By way of example but not limitation, the Apex compiler (104) may comprise, or operate in conjunction with, a low-level code test/debug application/service to receive the test/debug request, identify the low-level code, and to perform the requested low-level test/debug operation to test the low-level code (e.g., if possible, etc.), and so forth. The testing of the low-level code using the low-level code test/debug application/service on the application server (102-1) can be interactively between the application server (102-1) and the user device (118-1). The program/application inclusive of the low-level code may be executed in a process space 124 (e.g., or an organization-specific process space thereof) on the application server (102-1). In the low-level code test/debug process, some or all information, errors, warnings, etc., may be sent from the application server (102-1) to the user device (118-1) and displayed in the application debug UI (132). In the meantime, some or all user input (e.g., test/debug instructions to set break points, inspect traces, variables, etc.) may be sent from the user device (118-1) to the application server (102-1).

The application developer can review the source code in JavaScript, the transformed (or approved) code in Apex, any received information, errors, warnings, etc., and determine whether the low-level code meet a target represented by one or more application quality criteria for deployment. If the application developer determines that the low-level code does not meet the one or more application quality criteria for deployment, the application developer can continue to edit the approved source code in Apex (e.g., if necessary, etc.) in the Apex source code UI (138) and causes new low-level code generated from the latest approved source code in Apex. Additionally, optionally or alternatively, the application developer can go back to editing the JavaScript source code and start a new source code transformation operation and/or a new Apex compilation operation and/or a new low-level code test/debug process.

The foregoing may be repeated until the application developer determines that the (latest Apex-compiled) low-level code meets the one or more application quality criteria for deployment.

2.2 Application/Service Deployment

The application deployer UI (134) may be used to as a GUI front end of the application development tool to deploy the program/application inclusive of the low-level code. The GUI front end may comprise a graphic UI component (e.g., a user clickable button, a user selectable menu item, etc.) representing a control which, when clicked on or selected by the application developer, invokes an application deployment operation by way of sending an application deployment request to the application server (102-1). The application deployment request includes identification information for the low-level code, a type of application deployment, and other application deployment information.

An application deployer (e.g., 106, etc.), or an instance thereof, may be running on, or otherwise operating in conjunction with, the application server (102-1) to receive the application deployment request and perform the requested application deployment operation to deposit or store the program/application including but not limited to the low-level code in one or more application repositories.

In an example, the application deployment request may identify this program/application as an organization-specific program/application, and determine a specific organization (e.g., 114-1, etc.) with which the program/application is associated. The specific organization (114-1) may, but is not limited to, be identified based on one or more of: data fields or organization identification information in the application deployment request, the application developer's user identity, etc. The application deployer (106) may proceed to deploy the program/application as a program/application only available to the specific organization (114-1). The application deployer (106) may store the low-level code as application metadata 122-1 of a specific organization such as 114-1 hosted in the cloud-based computing system. Additionally, optionally or alternatively, application data 120-1 to be used, accessed or operated with the program/application may be pre-stored for the organization before the application deployment operation, or stored during, as a part of, or after, the application deployment operation.

In another example, the application deployment request may identify this program/application inclusive of the low-level code as a program/application available for download by various organizations hosted in the cloud-based computing system. The application deployer (106) may proceed to deposit the program/application in the form of a downloadable installable package as a program/application in an application exchange (e.g., 108, etc.) available for all or some of the organizations hosted in the cloud-based computing system to download and install.

An end user (e.g., an employee, a customer, a user, a staff member, an application developer, a non-application-developer user, etc.) of an organization (e.g., 114-1, etc.) may operate a user device 118-2 to run one or more applications 136-1, 136-2, 136-3, etc., to access application data and application services of the organization (114-1).

In some embodiments in which the program/application has been deployed by the application developer in the organization application repository (122-1) of the organization (114-1), the program/application may be selectable for execution by the end user operating with the user device (118-2). The one or more applications 136-1, 136-2, 136-3, etc., may include a running instance of the program/application inclusive of the low-level code compiled from the Apex code some or all of which is generated from the non-Apex code by the source code transformer (130).

In some embodiments in which the program/application has been deposited in the application exchange (108), the program/application inclusive of the low-level code may be selectable for download and installation by a designated user of the organization (114-1). The program/application may be downloaded and installed in an organization application repository (which may be the same as application metadata 122-1) of the organization (114-1). An end user of the organization (114-1) such as the end user operating the user device (118-2) may cause a running instance of the program/ application to run as a part of the one or more applications 136-1, 136-2, 136-3, etc., on the user device (118-2).

2.3 Source Code Transformation Examples

A cloud-based computer system may store a plurality of sets of organization-specific data objects (e.g., standard objects, custom objects, etc.) for a plurality of organizations hosted in the cloud-based computer system. Each set of organization-specific data objects may belong to, or may be associated with, a respective organization in the plurality of hosted organizations.

In some embodiments, the multitenant enterprise platform as implemented in the cloud-based computer system may support a (e.g., comprehensive, flexible, etc.) data security model to secure data and user access to the data of the organization (114-1) at different levels at an application level, object-level, field-level, record-level, etc. The cloud-based computer system can provide (e.g., GUI-based, script-based, JSON-file based, etc.) security management tools for (e.g., a designated user such as an administrator of, etc.) the organization (114-1) to specify, set and/or secure different user access settings to data objects of the organization (114-1) for different users of the organization (114-1). Example user access settings may specify data access permissions for users based on one or more of: user-specific profiles, user-specific permission sets, user-specific roles, specially granted permissions, and so forth.

In a first example, user access settings for a user in the organization (114-1) may specify that the user is granted with permissions to access the data object (302) fully, including all data instances of the data objects (302) and all data fields of these data instances of the data object (302).

In a second example, user access settings for a user in the organization (114-1) may specify that the user is granted with permissions to access the data object (302) partially or at a specific data instance level; the user's permissions limit the user's access of the data object (302) to a proper subset of data instances in all the data instances of the data objects (302) and all data fields of data instances in the proper subset of data instances of the data object (302). An example proper subset of data instances may be, but is not limited to, any of: one or more specific data instances, one or more specific rows in a table or view represented by the data object (302), etc. For example, the permissions granted to the user may allow the user to access the data instance (304-1) but not to the data instance (304-2), of the data object (302).

In a third example, user access settings for a user in the organization (114-1) may specify that the user is granted with permissions to access the data object (302) partially or at a specific data field level; the user's permissions limit the user's access of the data object (302) to a proper subset of data fields in all the data fields of the data objects (302) in all the data instances of the data object (302). An example proper subset of data fields may be, but is not limited to, any of: one or more specific data fields, one or more specific columns in a table or view represented by the data object (302), etc. For example, the permissions granted to the user may allow the user to access a proper subset of data fields in full set of data fields (312) of the data object (302), but not other data fields of the data object (302).

Additionally, optionally or alternatively, various combinations of application level, object level, instance level, field level, and so forth may be used to specify permissions granted to a user of the organization (114-1) to various data objects, various data instances of the data objects, data fields of the data objects, and so forth, in the organization (114-1).

A source code transformer (e.g., 130 of FIG. 1 or FIG. 2, etc.) as described herein can be used to transform source code in a first high-level programming language (e.g., JavaScript, etc.) into source code in a second high-level programming language (e.g., Apex, etc.). In some embodiments, the second high-level programming language represents a hosted language; low-level code generated from the transformed source code in the second high-level programming language may be (e.g., entirely, substantially all, etc.) executed on the server side of the multitenant enterprise platform. In these embodiments, the low-level code can explicitly and/or implicitly inherit benefits and advantages of the second high-level programming language being a hosted language, taking advantage of security, transactional context, performance, etc., as provided in the multitenant enterprise platform environment.

Figure 3A:
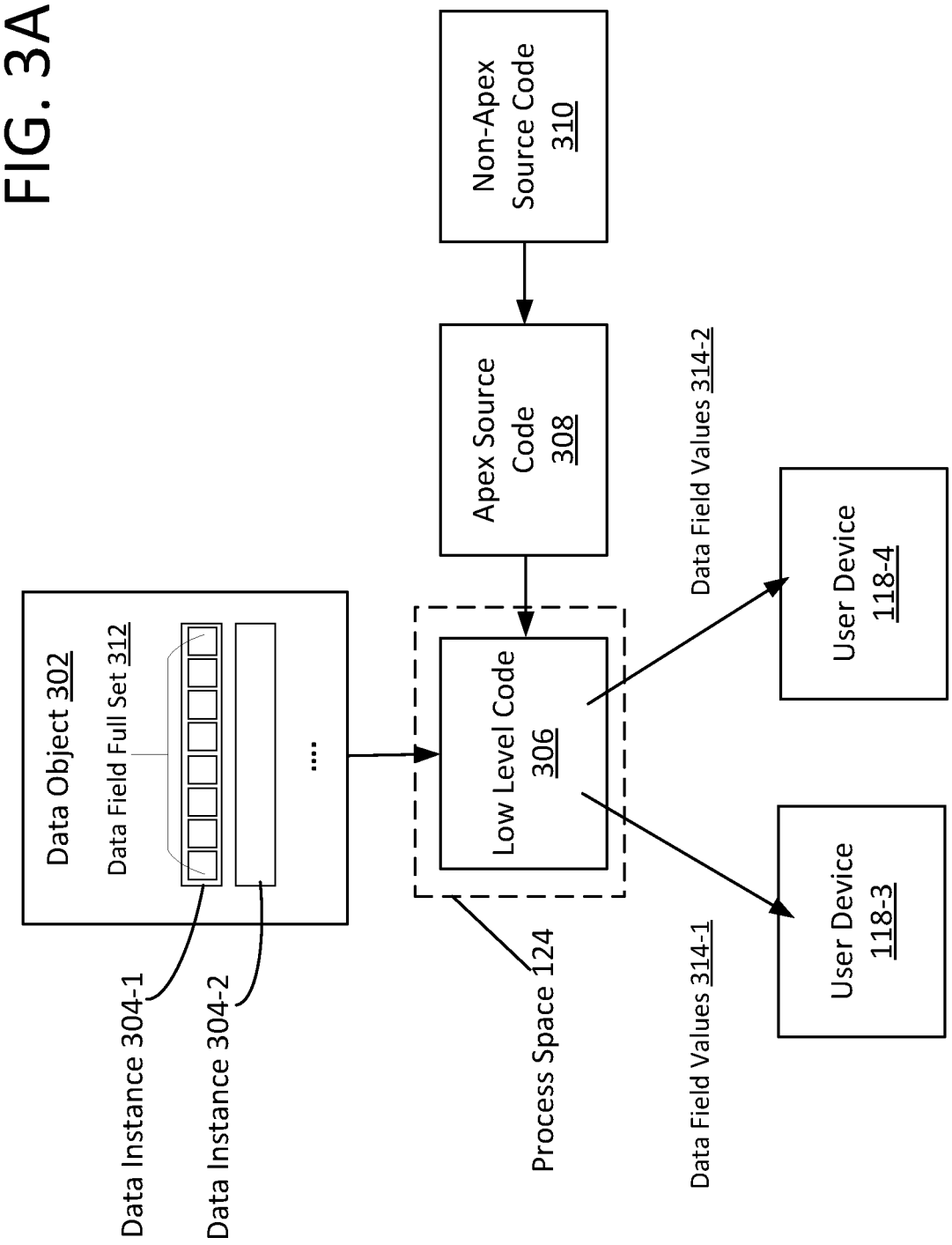
FIG. 3A and FIG. 3B illustrate example transformations of source code in a first high-level programming language such as JavaScript to source code in a second high-level programming language such as Apex.

FIG. 3A illustrates example transformation of source code in a first high-level programming language such as JavaScript to source code in a second high-level programming language such as Apex.

As illustrated in FIG. 3, a data object 302 in a set of organization-specific data objects for an organization (e.g., 114-1 of FIG. 1 or FIG. 2, etc.) hosted in the cloud-based computer system may comprise one or more data instances 304-1, 304-2, etc. Each data instance (e.g., 304-1, etc.) of the data object (302) may comprise a full set of data values (including but not limited to null values) for a full set of data fields 312.

In various embodiments, the data object (302) as illustrated in FIG. 3A may represent any data object in a wide variety of data objects available (e.g., defined, deployed, automatically provided, etc.) for the organization (114-1) on the multitenant enterprise platform.

In an example, for the purpose of illustration only, the data object (302) represents a standard object "Account", which comprises a plurality of data instances (e.g., 304-1, 304-2, etc.) representing a plurality of customer accounts associated with a plurality of customers of the organization (114-1). The data instance (304-1) may represent a first customer account (in the plurality of customer accounts) for a first customer in the plurality of customers of the organization (114-1); the data instance (304-2) may represent a second customer account (in the plurality of customer accounts) for a second customer in the plurality of customers of the organization (114-1); and so on.

A portion of non-Apex source code 310 such as a JavaScript source code portion as shown in TABLE 1 below may be written by an application developer operating the user device (118-1) of FIG. 2 to access customer account data in the standard object "Account" represented by the data object (302). The application developer may write the non-Apex source code (310) in a manner that no explicit security data access APIs are specified for the purpose of complying with the data security model implemented on the multitenant enterprise platform.

For example, in the JavaScript source code (310) as illustrated in TABLE 1, the application developer can simply specify a general query statement such as a "SELECT" statement in line 3, which retrieves one or more data instances with a "Name" data field matching the value specified in an input parameter "keyword", without specifying a security check. In addition, the "SELECT" statement in the JavaScript source code includes a wide card character "*", which in a literal interpretation could indicate retrieving all defined data fields of the "Account" data object (302).

TABLE 1

```
1  class SelectAllExpansionExample {
2    selectAccountsWithAllVisibleFields(keyword) {
3      return [SELECT * FROM Account WHERE Name = :keyword]
4    }
5  }
```

The source code transformer (130) (e.g., automatically, as requested by the application developer, etc.) receives the non-Apex source code (310) in a source code transformation request and converts/transforms the portion of the non-Apex source code (310) into a corresponding portion of Apex source code 308 as illustrated in TABLE 2 below.

TABLE 2

```
1  public class SelectAllExpansionExample {
2    public Account[ ] selectAccountsWithAllVisibleFields(keyword) {
3      String fieldList = this.getAccountFieldList( );
4      return [SELECT :fieldList FROM Account WHERE Name = :keyword];
5    }
6    private String getAccountFieldList( ) {
7      String fieldList = '';
8      Schema.DescribeSObjectResult objectSchema = Account.sObjectType.getDescribe( );
9      Map<String, Schema.SObjectType> fieldMap = objectSchema.fields.getMap( );
10     for (String fieldname : fieldMap.keySet( )) {
11       SObjectField field = fieldMap.get(fieldname);
12       Schema.DescribeFieldResult fieldDescription = field.getDescribe( );
13       if (fieldDescription.isAccessible( )) {
14         if (fieldList.length( ) > 0) {
15           fieldList += ', ';
16         }
17         fieldList += fieldName;
18       }
19     }
20   }
21 }
```

As can be see above, the transformed Apex source code (308) may be tedious for application developers, especially if relatively less experienced with Apex, to write by hand. More importantly, the source code transformer (130) can be implemented to leverage security features available on the multitenant enterprise platform such as field level security.

For example, the organization (114-1) may have configured its user permission settings to the "Account" data object (302) for visibility control. These user permission settings may specify whether a certain user can see certain data fields or not. For example, a first user such as a manager may be granted with permissions to access all data fields defined in the "Account" data object (302). A second user such as a sales representative may be granted with permissions to access a proper set of data fields in all the data fields of the "Account" data object (302).

As illustrated in TABLE 2, the transformed Apex source code (308) includes program logic at lines 3 and 6-20 to (e.g., dynamically, at runtime, etc.) build a list of data fields in the "Account" data object (302), data access to which have been granted to a user who causes (e.g., a runtime instance of, etc.) low-level code (306) compiled from the transformed Apex source code (308) to be executed at the server-side of the multitenant enterprise platform at runtime.

Thus, the transformed Apex source code (308), or the low-level code (306) generated therefrom, is not tied to be executed only by a particular user in the organization (114-1), but rather may be executed by any of some or all users in the organization (114-1) for which an application/service including the low-level code (306) is available for execution by these users. In addition, because different user permission settings may be specified for different users, these users at runtime may be returned with data field values for different lists of visible data fields by way of the program logic at lines 3 and 6-20 in the transformed Apex source code (308).

In an example, at runtime, the first user (e.g., the manager, etc.) that have been granted permissions to access the full set of data fields (312) operating with a user device 118-3 may interact with an application server (which may, but is not limited to, be 102-1 of FIG. 2), and cause a first running instance of the low-level code (306) (or the application/service of which the low-level code (306) is a part) executed in a process space (e.g., 124, etc.) of the application server. For the first user, a list of data fields corresponding to the full set of data fields (312) of the data object (302) may be built by the first running instance of the low-level code (306). As a result, data field values 314-1 for the full set of data fields (312) are returned to the user device (118-3) operated by the first user.

In another example, at runtime, the second user (e.g., the sales representative, etc.) that have been granted permissions to access a proper set of data fields in the full set of data fields (312) operating with a user device 118-4 may interact with an application server (which may, but is not limited to, be 102-1 of FIG. 2), and cause a second running instance of the low-level code (306) (or the application/service of which the low-level code (306) is a part) executed in a process space (e.g., 124, etc.) of the application server. For the second user, a list of data fields corresponding to the proper set of data fields in the full set of data fields (312) of the data object (302) may be built by the second running instance of the low-level code (306). As a result, data field values 314-2 for the proper subset of data fields—but excluding data field values for other data fields of the full set of data fields (312)—are returned to the user device (118-4) operated by the first user.

Additionally, optionally or alternatively, other users may access by way of the low-level code (306) generated from the transformed Apex code data values for the full set of data fields (312) or data values for different proper subsets of data fields in the full set of data fields (312), depending on specific permissions granted to these other users by the organization (114-1).

A multitenant enterprise platform in a cloud-based computer system that hosts numerous organizations may implement or enforce governor limits that ensure no single running instance of low-level code generated from (e.g., transformed, handwritten, etc.) source code in a second high-level programming language such as Apex impact the overall service, performance and scalability of the multitenant enterprise platform. Some or all of the governor limits (e.g., Apex limits, platform-wide limits, organization-specific limits, etc.) may be used by the multitenant enterprise platform to ensure some or all processes (or running instances) to receive fair treatments by limit the number of operations (e.g., DML operations, SOQL operations, etc.) performed within one process (e.g., within one running instance of the low-level code, etc.) within applicable governor limit(s).

A portion of non-Apex source code such as a JavaScript source code portion as shown in TABLE 3 below may be written by an application developer to access customer account data in the "Account" data object (302). The application developer may write the non-Apex source code in TABLE 3 in a manner that no explicit handling of governor limits that may be implemented/enforced on the multitenant enterprise platform. For example, in the JavaScript source code as illustrated in TABLE 3, the application developer can simply specify a general query statement such as a "SELECT" statement in line 3, which retrieves all data instances with no predicate specified, which in a literal interpretation could indicate retrieving all data instances of the "Account" data object (302).

TABLE 3

```
1 class WorkingWithLimitsExample {
2   retrieveAllAcounts( ) {
3     return [SELECT Id, Name FROM ACCOUNT]
4   }
5 }
```

The source code transformer (130) (e.g., automatically, as requested by the application developer, etc.) receives the non-Apex source code as illustrated in TABLE 3 in a source code transformation request and converts/transforms the portion of the non-Apex source code into a corresponding portion of Apex source code as illustrated in TABLE 4 below.

TABLE 4

```
1 public class WorkingWithLimitsExample {
2   public Account[ ] retrieveAllAccounts( ) {
3     Account[ ] result = new Account[ ];
4     for (List<Account> accounts : [SELECT Id, Name FROM
        ACCOUNT]) {
5       result.addAll(accounts);
6     }
7     return result;
8   }
9 }
```

As can be see above, the source code transformer (130) can be implemented to handle any governor limit enforced/implemented on the multitenant enterprise platform, whereas the original Non-Apex source code does not implement any such governor limit handling. For example, a first governor limit may be implemented/enforced by the multitenant enterprise platform on the total number of records (e.g., a maximum batch of 200 records, etc.) that may be returned in a single "SELECT" statement (or a corresponding data query operation) with respect to a data object such as the "Account" data object (302). A second governor limit may be implemented/enforced by the multitenant enterprise platform on the total number of records that may be returned in a set of multiple consecutive "SELECT" statements (or a corresponding set of consecutive data query operation) with respect to a data object such as the "Account" data object (302).

To handle these governor limits, the transformed Apex source code includes program logic at lines 3-7 of a "for" loop to (e.g., dynamically, at runtime, etc.) handle any number (as permitted by the first governor limit) of data instances in the "Account" data object (302) that are returned by any number (as permitted by the second governor limit) of consecutive "SELECT" statements (or corresponding data query operations) with respect to the "Account" data object (302). Thus, the transformed Apex source code (308), or the low-level code (306) generated therefrom, is not tied to perform only a single "SELECT" statement (or a single data query operation) with respect to the "Account" data object (302), but rather is capable of retrieving the maximum total number of records allowable under the governor limits.

Source code transformation techniques as described herein can be used to speed up application/service development for an organization hosted in the cloud-based computing system. Instead of writing relatively lengthy source code with a relatively large number of keystrokes, an application developer can use a relatively simple, intuitive high-level programming language such as JavaScript to write source code for applications/services to be deployed to the multi-tenant enterprise platform in the cloud-based computing system.

A portion of non-Apex source code such as a JavaScript source code portion as shown in TABLE 5 below may be written by an application developer to filter all accounts (or all data instances of the "Account" data object (302)) with an age threshold (applying to data field values of an "age" data field in all the data instances of the "Account" data object (302)) for staleness, and to add up outstanding values (as indicated by data field values of an "value" data field in the data instances of the "Account" data object (302)) in the stabled accounts (as represented by the filtered data instances of the "Account" data object (302)) to a single accumulated value.

The application developer may write the non-Apex source code (310) with a relatively small number (e.g., 270, etc.) of keystrokes in an intuitive manner that uses language features, operators, expressions, etc., that exist or are currently supported in JavaScript but that do not exist or are not currently supported in Apex. For example, in the JavaScript source code as illustrated in TABLE 5, the application developer can simply specify a "reduce" function, an arrow operator (denoted as "=>") in lines 3 and 4, which indicate filtering all the data instances (denoted as "accounts") of the "Account" data object (302) and adding up the values (denoted as "currentAccount.value") of the filtered data instances with values for "age" exceeding the age threshold (denoted as "threshold") to the accumulated value (denoted as "accumulatedAccountValue").

The source code transformer (130) (e.g., automatically, as requested by the application developer, etc.) receives the non-Apex source code as illustrated in TABLE 5 in a source code transformation request and converts/transforms the portion of the non-Apex source code into a corresponding portion of Apex source code as illustrated in TABLE 6 below.

TABLE 6

```
 1  public class ArrayFunctionExample {
 2    public Integer sumofStaleAccountValues(List<Account> accounts, Integer threshold) {
 3      Integer accumulatedAccountValue = 0;
 4      for (Account currentAccount : accounts) {
 5        if (currentAccount.age > threshold) {
 6          accumulatedAccountValue += currentAccount.value;
 7        }
 8      }
 9      return accumulatedAccountValue;
10    }
11  }
```

As can be see above, the source code transformer (130) can be implemented to convert source code with language-specific features used in the original Non-Apex source code to equivalent Apex source code even if such language-specific features may exist, or may be currently supported, in JavaScript but may not exist, or may not be currently supported, in Apex. For example, transformed source code in Apex at lines 3-9 goes through all the input accounts, compares the "age" data field values with the age threshold, and adds up the "value" data field values of any account with the "age" data field values exceeding the age threshold. Thus, the application developer can be freed from writing Apex source code with a relatively large number of keystrokes, and instead write the intuitively written source code in JavaScript using the language features available in the JavaScript within a relatively short amount of time with a relatively small number of keystrokes. Additionally, optionally or alternatively, the transformed Apex source code can be converted (e.g., under the hood, etc.) from the JavaScript source code based on currently supported language features of Apex using the best practice that has been developed and adopted for writing Apex source code.

As compared with a general-purpose programming language such as JavaScript, Apex represents a hosted language of a multitenant enterprise platform in a cloud-based computing system hosting a large number of organizations. Apex source code is saved, runs on, and is tailored for data access and data manipulation on the multitenant enterprise platform by (e.g., natively, by design, etc.) taking advantage of domain-specific characteristics, benefits, services, facilities, and so forth, of the multitenant enterprise platform.

TABLE 5

```
1  class ArrayFunctionExample {
2    sumofStaleAccountValues(accounts, threshold) {
3      return accounts.filter(account => account.age > threshold)
4        .reduce((accumulatedAccountValue, currentAccount) => accumulatedAccountValue
5          + currentAccount.value)
6    }
7  }
8  // 270
```

An organization (e.g., 114-1 of FIG. 1 or FIG. 2, etc.) hosted in the cloud-based computer system may comprise a set of organization-specific data objects. The set of organization-specific data objects may include standard data objects, custom data objects, etc. Examples of standard data objects may include, but are not necessarily limited to only, any of: the previously mentioned "Account" data object (302), a "Contact" data object, a "Lead" data object, a "Case" data object, an "Opportunity" data object, etc. The standard data object may be one of a set of standard objects (e.g., automatically, etc.) provided by the multitenant enterprise platform to the organization (114-1). In data access operations, a standard data object for an organization may be referenced by the organization with a common name shared by some or all organizations on the multitenant enterprise platform used to refer to the same type of standard data objects as the standard data object. In data access operations, a standard data field of a standard data object for an organization may be referenced by the organization with a common name shared by some or all organizations on the multitenant enterprise platform used to refer to the same type of standard data field of the same type of standard data objects as the standard data object. Any standard object in the set of standard objects for the organization (114-1) may comprise a set of standard data fields as well as zero or more custom data fields defined or specialized for the organization (114-1). Each of some or all organizations hosted in the cloud-based computing system may be initially and respectively given a similar (e.g., the same, etc.) set of standard objects with similar (e.g., the same, etc.) standard data fields for these standard objects. Subsequently, these organizations can customize any, some or all standard objects in their respective set of standard objects based on different uses or needs of the different organizations.

Source code transformation techniques as described herein can be used to transform non-Apex source code to Apex source code that enables an organization to make use of standard objects (e.g., automatically, etc.) provided by the multitenant enterprise platform as well as to add/remove/update (e.g., using Apex Metadata API, etc.) and make use of custom objects specifically for the organization. The transformed Apex source code also enables the organization to add/remove/update (e.g., using Apex Metadata API, etc.) and make use of custom data fields to any of the standard objects in addition to standard data fields of the standard objects as (e.g., automatically, etc.) provided by the multitenant enterprise platform for the organization.

Figure 3B:
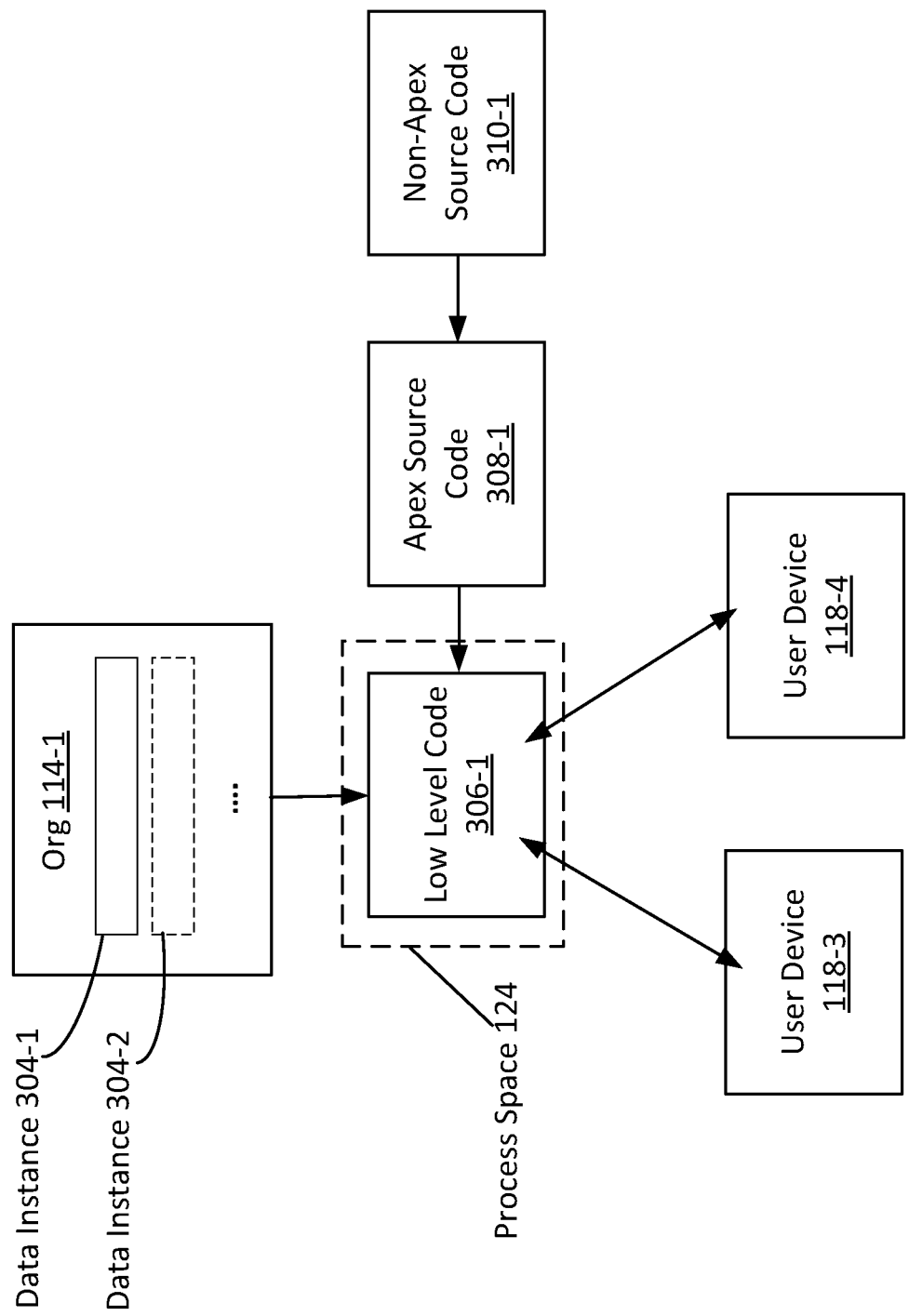

FIG. 3B illustrates example transformation of source code in a first high-level programming language such as JavaScript to source code in a second high-level programming language such as Apex.

As illustrated in FIG. 3B, a first data object 302-1 has already been deployed for the organization (114-1) as a part of the set of data objects in the organization (114-1) that are available for data access by users of the organization (114-1) depending on the users' respective permission settings.

For the purpose of illustration, a portion of non-Apex source code 310-1 such as a JavaScript source code portion as shown in TABLE 7 below may be written by an application developer operating the user device (118-1) of FIG. 2 to add or define a second data object 302-2 (or a "Property" custom object) be deployed to the multitenant enterprise platform for the organization (114-1). The application developer may write the non-Apex source code (310-1) in a manner that no explicit Apex Metadata APIs available to Apex as a host language. This allows the application developer to define a custom object programmatically in the non-Apex source code (310-1) and avoid using a (e.g., GUI-based, etc.) user interface to define such an object.

For example, in the JavaScript source code (310-1) as illustrated in TABLE 7, the application developer can simply specify values for mandatory data fields (e.g., data object configuration values, built-in values, etc.) of the second data object (302-2) (or the to-be-added "Property" custom object) such as "fullName", "label", "pluralLabel", etc. In addition, the application developer can define/specialize the second data object (302-2) (or the to-be-added "Property" custom object) with a set of custom data fields such as "Location" as a string, "Viewed" as a Boolean value, etc.

TABLE 7

```
 1 import { CustomObject } from './lib/scaffold'
 2
 3 export default class Property extends CustomObject {
 4   constructor(props) {
 5     super(Object.assign({ }, props,
 6       {fullName: 'Property___c', label: 'Property', pluralLabel:
          'Properties'}))
 7   }
 8 }
 9
10 Property.customFields = {
11   {
12     Location: CustomObject.Type.String,
13     Viewed: CustomObject.Types.Boolean
14   }
15 }
```

The source code transformer (130) (e.g., automatically, as requested by the application developer, etc.) receives the non-Apex source code (310-1) in a source code transformation request and converts/transforms the portion of the non-Apex source code (310-1) into a corresponding portion of Apex source code 308-1 as illustrated in TABLE 8 below.

TABLE 8

```
 1 public class DeployGenCustomObjectExample {
 2   public void deployProperty( ) {
 3     CustomObject customObject = new CustomObject( );
 4     customObject.fullName = 'Property___c';
 5     customObject.label = 'Property';
 6     customObject.pluralLabel = 'Properties';
 7     customObject.cityField = new MetadataService.CustomField( );
 8     customObject.cityField.type_x = 'Text';
 9     customObject.nameField.label = 'Location';
10     List<SaveResult> results = MetadataService.createMetadata(new
11       MetadataService.Metadata[ ] { customObject });
12     handleSaveResults(results[0]);
13   }
14 }
```

As illustrated in TABLE 8, the transformed Apex source code (308-1) includes program logic at lines 3-12 for (e.g., programmatically, etc.) deploying the second data object (302-2) (or the to-be-added "Property" custom object). The transformed Apex source code (308-1) can be compiled by an Apex compiler (e.g., 104 of FIG. 1 or FIG. 2, etc.) into low-level code 306-1.

A designated user (e.g., an authorized user, an administrator, etc.) of the organization (114-1) can operate with a user device (e.g., 118-3, etc.) to interact with an application server (which may, but is not limited to, be 102-1 of FIG. 2), and cause a running instance of the low-level code (306-1) (or the application/service of which the low-level code (306-1) is a part) executed in a process space (e.g., 124, etc.) of the application server to deploy the second data object (302-2) (or the to-be-added "Property" custom object) in the multitenant enterprise platform for the organization (114-1).

The second data object (302-2) (or the to-be-added "Property" custom object) is not a data object with access limited only to the application developer who develops the non-Apex code (310-1) or generates the Apex code (308-1) at development time or only to the designated user who executes the low-level code (306-1) at runtime.

Once deployed in the multitenant enterprise platform for the organization (114-1), the second data object (302-2) (or the to-be-added "Property" custom object) is persistently maintained in the multitenant enterprise platform, and is available for online access by different users of the organization (114-1) depending on these users' respective permission settings in relation to the second data object (302-2).

Applications/services and/or users of the organization (114-1) can make data access operations with respect to the second data object (302-2) just like making data access operations with respect to any other custom data objects or standard data objects that have been deployed automatically, via GUI interfaces, or programmatically, to the multitenant enterprise platform for the organization (114-1).

For the purpose of illustration, a portion of non-Apex source code such as a JavaScript source code portion as shown in TABLE 9 below may be written by an application developer operating the user device (118-1) of FIG. 2 to access the second data object (302-2) (or the "Property" custom object) after it has been deployed to the multitenant enterprise platform for the organization (114-1).

For example, in the JavaScript source code as illustrated in TABLE 9, the application developer can write program logic at lines 3 and 4 for inserting a new data instance into the second data object (302-2) (or the already-added "Property" custom object). In addition, the application developer can write program logic at lines 6-8 for retrieving and updating all data instances of the second data object (302-2) (or the already-added "Property" custom object).

TABLE 9

```
1  const property = new Property('Location=...');
4  insert property 6  properties InToronto = From Property WHERE Location =
   'properties InToronto for each property = property.Viewed = true)
8  update propertiesInToronto
```

The source code transformer (130) (e.g., automatically, as requested by the application developer, etc.) receives the non-Apex source code in TABLE 9 in a source code transformation request and converts/transforms the portion of the non-Apex source code into a corresponding portion of Apex source code as illustrated in TABLE 10 below.

TABLE 10

```
 1  public class MainClass {
 2    public void run( ) {
 3      Property property = new Property(Location='Toronto');
 4      insert property;
 5
 6      Property[ ] propertiesInToronto = [SELECT Id, Name, Location from Property where
 7        Location = 'Toronto'];
 8      for (Property property in propertiesInToronto) {
 9        Property.Viewed = true;
10      }
11      update propertiesInToronto;
12    }
13  }
```

As illustrated in TABLE 10, the transformed Apex source code includes program logic at lines 3-11 for (e.g., programmatically, etc.) accessing the second data object (302-2) (or the already added "Property" custom object).

A source code transformer as described herein that transforms non-Apex source code to Apex source code supports some or all database operations available in Apex including but not limited to data query operations and data manipulation language (DML) operations. For example, "update propertiesInToronto" is an example of a DML in JavaScript that can be translated into the corresponding Apex code.

For the purpose illustration, it has been described that the source code transformer can generate, from non-Apex source code that defines a custom data object, transformed Apex source code that deploys the defined custom data object to the multitenant enterprise platform for the organization (114-1) and make the custom data object available for access by users of the organization (114-1). It should be noted that, in various embodiments, the source code transformer can generate transformed Apex code to generate, from non-Apex source that defines components, objects, classes, class instances, methods, interfaces, triggers, user interactive pages, etc., transformed Apex code that deploys the defined components, objects, classes, class instances, methods, interfaces, triggers, user interactive pages, etc., to the organization and make these deployed entities available for use by users of organization (114-1).

In some embodiments, application developers can operate with user devices to write, develop or define non-Apex source code entirely in one or more general-purpose programming languages such as JavaScript, for example in a folder or project stored at least in part with the user devices. The source code transformer can compile the source code in the whole folder or project to generate one or more Apex source code packages that can be compiled by Apex compiler for execution on, and/or for deployment to, the multitenant enterprise platform.

Additionally, optionally or alternatively, a source code transformer as described herein can be used to exploit the best practiced developed or made available for Apex, including but not necessarily limited to only, any of: advanced reflection capabilities, capabilities to override system base classes such as system debug classes, language features such as case statement syntax, operators, etc, namespaces in code base, dependency injection, de-constructors, anonymous functions, delegations, custom attributes for classes, dynamic type casting, partial classes, operator overrides, and so forth.

3.0 Example Embodiments

Figure 4:
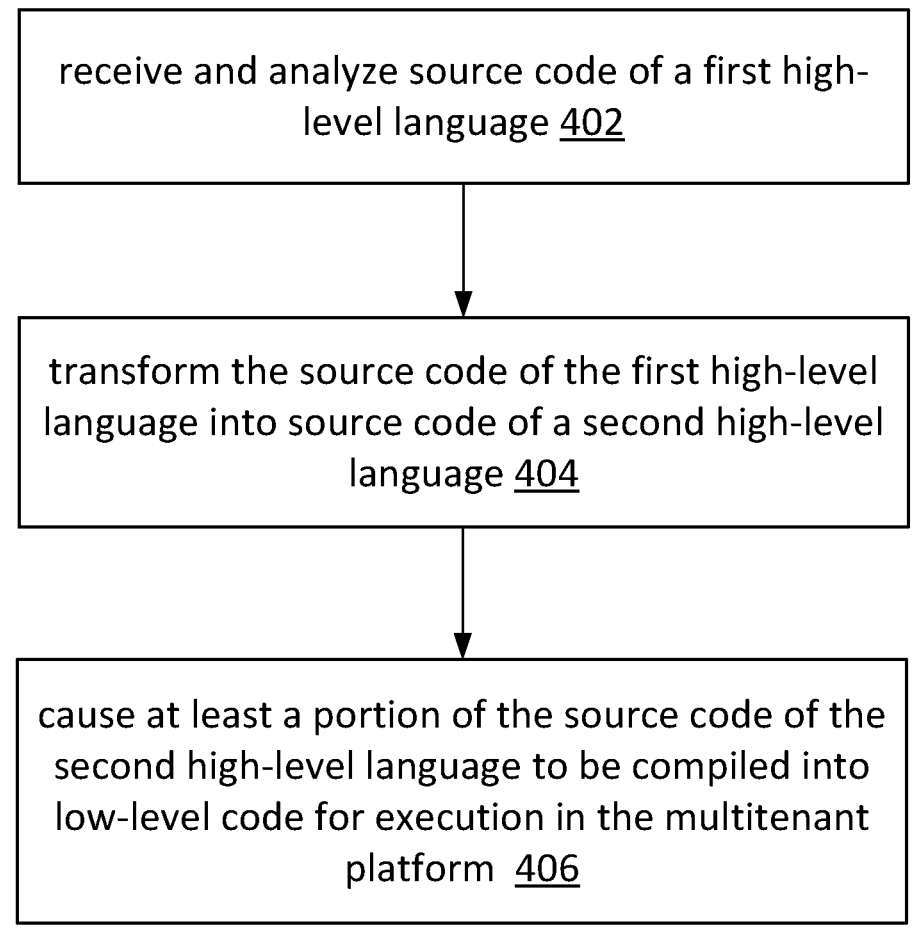
FIG. 4 illustrates an example process flow.

FIG. 4 illustrates an example process flow that may be implemented by a computing system (or device) as described herein. In block 402, an application server (e.g., 102 of FIG. 1 or 102-1 of FIG. 2, etc.) receives and analyzes source code of a first high-level language (e.g., a non-Apex high-level programming language, JavaScript, etc.).

In block 404, the application server transforms the source code of the first high-level language into source code of a second high-level language (e.g., a hosted language, Apex, etc.). The source code of the second high-level language is customized to a specific organization among a plurality of organizations that are hosted in a multitenant platform, optimized for execution on a multitenant platform of a cloud-based computing system, and so forth.

In block 406, the application server causes at least a portion of the source code of the second high-level language to be compiled into low-level code for execution in the multitenant platform.

In an embodiment, the multitenant platform hosts a plurality of organizations. Each organization in the plurality of organizations hosted by the multitenant platform is provided by the multitenant platform with one or more corresponding organization-specific instances for one or more standard data objects. All organization-specific instances of each standard data object in the one or more standard data objects are referenced by a corresponding platform-wide standard data object name in one or more platform-wide standard data object names for the one or more standard data objects. The application server is further configured to perform: identifying, in the source code of the first high-level language, a first source code portion, of the first high-level language, that uses a particular platform-wide standard data object name, among the one or more platform-wide standard object names, to reference and access a particular standard data object in the one or more standard data objects; generating, in the source code of the second high-level language, a second source code portion, of the second high-level language, to be compiled into a low-level code portion in the low-level code, which low-level code portion, when executed by one or more computing processors, causes the one or more computing processors to perform at runtime: identifying a particular organization in the plurality of organizations hosted in the multitenant platform; referencing and accessing a particular organization-specific instance of the particular standard data object among all organization-specific instances of the particular standard data object, which particular organization-specific instance of the particular standard data object is provided by the multitenant platform to the particular organization in the plurality of organizations.

In an embodiment, the first source code of the first high-level language is free of access control source code statements with respect to the particular standard data object; the second source code portion of the second high-level language is generated to include access control source code statements that control user access to the particular organization-specific instance of the particular standard data object.

In an embodiment, the first source code portion of the first high-level language comprises a wildcard reference to all data fields in the particular standard data object; a plurality of data fields represents all data fields in the particular organization-specific instance of the particular standard data object; the second source code portion of the second high-level language is generated to include source code statements to expand, by way of executing the low-level code at runtime, the wildcard reference to a subset of data fields in the plurality of data fields in the particular organization-specific instance of the particular standard data object; the subset of data fields comprises all data fields, in the particular instance of the particular standard data object, that are accessible to a user that causes the low-level code to be executed at the runtime.

In an embodiment, the plurality of data fields in the particular organization-specific instance of the particular standard data object includes at least one of: a standard data field as provided by the multitenant platform, or a custom data field as generated by the particular organization.

In an embodiment, the first source code portion of the first high-level language comprises a database statement for executing a database operation with respect to the particular standard data object; the second source code portion is generated to include source code statements, in the second high-level language, to enforce an applicable (e.g., platform-specific, operation-specific, transaction-type-specific, operation-type-specific, etc.) governor limit to a specific database operation type to which the database operation belongs when the low-level code is caused to be executed at runtime.

In an embodiment, the first source code portion of the first high-level language defines a custom object exclusive of one or more standard data objects provided by the multitenant platform; the second source code portion of the second high-level language is inclusive of source code statements, in the second high-level language, to deploy the customer object in the particular organization as hosted in the multitenant platform; wherein the customer object, once deployed, is accessible to one or more users in the particular organization but is inaccessible to other users in other organizations as hosted in the multitenant platform.

In an embodiment, the application server is further configured to generate bytecodes that enable high performance execution of operations and logics specified in the source code of the first high-level language.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
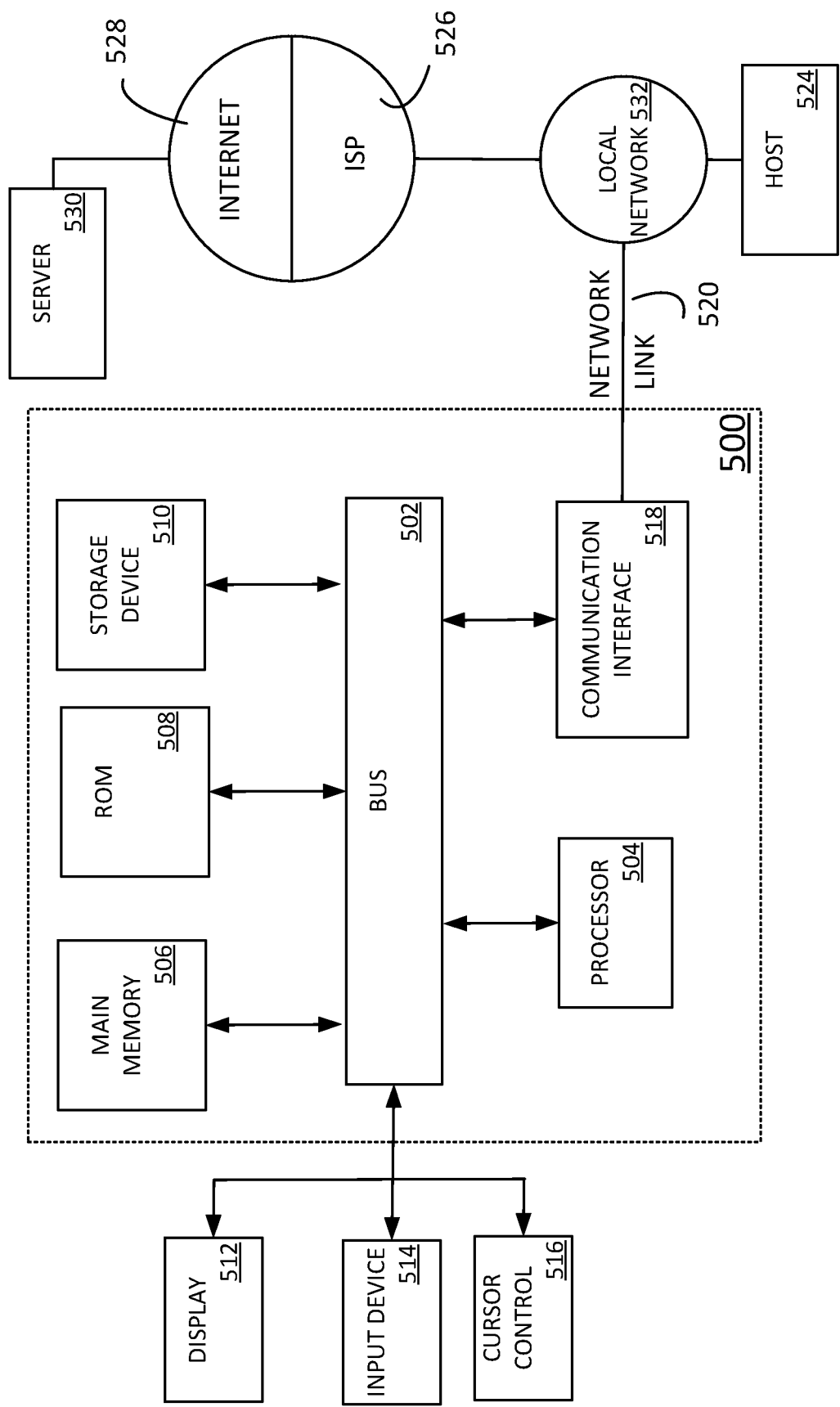
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    identifying, in source code of a first high-level programming language to be transformed into source code of a second high-level programming language, a first source code portion that uses a particular standard data object name to reference and access a particular standard data object;
    transforming the first source code portion in the source code of the first high-level programming language to a second source code portion in the source code of the second high level programming language;
    compiling the second source code portion in the source code of the second high-level programming language into a low-level code portion in low-level code, which when executed in a multitenant platform, causes runtime performance of:
        identifying a specific organization from among a plurality of organizations that are hosted in the multitenant platform; and
        referencing and accessing a particular organization-specific instance of the particular standard data object among a plurality of organization-specific instances of the particular standard data object, wherein the plurality of organization-specific instances of the particular standard data object is provided by the multitenant platform to the plurality of organizations that are hosted in the multitenant platform, and wherein the particular organization-specific instance of the particular standard data object is provided by the multitenant platform to the specific organization from among the plurality of organizations that are hosted in the multitenant platform.

2. The computer-implemented method as recited in claim 1, wherein the first source code portion in the source code of the first high-level programming language is free of access control source code statements with respect to the particular standard data object, and wherein the second source code portion in the source code of the second high-level programming language is generated to include access control source code statements that control user access to the particular organization-specific instance of the particular standard data object.

3. The computer-implemented method as recited in claim 1, wherein the first source code portion in the source code of the first high-level programming language comprises a wildcard reference to all data fields in the particular standard data object, and wherein the second source code portion in the source code of the second high-level programming language determines a subset of data fields, accessible to a user at runtime, in the particular organization-specific instance of the particular standard data object.

4. The computer-implemented method as recited in claim 3, wherein the subset of data fields includes at least one of: a standard data field as provided by the multitenant platform, or a custom data field defined by the specific organization from among the plurality of organizations that are hosted in the multitenant platform.

5. The computer-implemented method as recited in claim 1, wherein the first source code portion in the source code of the first high-level programming language comprises a database statement for executing a database operation with respect to the particular standard data object.

6. The computer-implemented method as recited in claim 1, wherein the second source code portion in the source code of the second high-level programming language is generated to include source code statements to deploy a customer object in the specific organization from among the plurality of organizations that are hosted in the multitenant platform, and wherein the customer object is accessible to users in the specific organization from among the plurality of organizations that are hosted in the multitenant platform but not other users in other organizations from among the plurality of organizations that are hosted in the multitenant platform.

7. The computer-implemented method as recited in claim 1, further comprising: generating bytecodes that enable high performance execution of operations and logics specified in the source code of the first high-level programming language.

8. One or more non-transitory computer readable media storing a program of instructions that is executable by a device to perform:
    identifying, in source code of a first high-level programming language to be transformed into source code of a second high-level programming language, a first source code portion that uses a particular standard data object name to reference and access a particular standard data object;
    transforming the first source code portion in the source code of the first high-level programming language to a second source code portion in the source code of the second high-level programming language;

compiling the second source code portion in the source code of the second high-level programming language into a low-level code portion in low-level code, which when executed in a multitenant platform, causes runtime performance of:

identifying a specific organization from among a plurality of organizations that are hosted in the multitenant platform; and referencing and accessing a particular organization-specific instance of the particular standard data object among a plurality of organization-specific instances of the particular standard data object, wherein the plurality of organization-specific instances of the particular standard data object is provided by the multitenant platform to the plurality of organizations that are hosted in the multitenant platform, and wherein the particular organization-specific instance of the particular standard data object is provided by the multitenant platform to the specific organization from among the plurality of organizations that are hosted in the multitenant platform.

9. The one or more non-transitory computer readable media as recited in claim 8, wherein the first source code portion in the source code of the first high-level programming language is free of access control source code statements with respect to the particular standard data object, and wherein the second source code portion in the source code of the second high-level programming language is generated to include access control source code statements that control user access to the particular organization-specific instance of the particular standard data object.

10. The one or more non-transitory computer readable media as recited in claim 8, wherein the first source code portion in the source code of the first high-level programming language comprises a wildcard reference to all data fields in the particular standard data object, and wherein the second source code portion in the source code of the second high-level programming language determines a subset of data fields, accessible to a user at runtime, in the particular organization-specific instance of the particular standard data object.

11. The one or more non-transitory computer readable media as recited in claim 10, wherein the subset of data fields includes at least one of: a standard data field as provided by the multitenant platform, or a custom data field defined by the specific organization from among the plurality of organizations that are hosted in the multitenant platform.

12. The one or more non-transitory computer readable media as recited in claim 8, wherein the first source code portion in the source code of the first high-level programming language comprises a database statement for executing a database operation with respect to the particular standard data object.

13. The one or more non-transitory computer readable media as recited in claim 8, wherein the second source code portion in the source code of the second high-level programming language is generated to include source code statements to deploy a customer object in the specific organization from among the plurality of organizations that are hosted in the multitenant platform, and wherein the customer object is accessible to users in the specific organization from among the plurality of organizations that are hosted in the multitenant platform but not other users in other organizations from among the plurality of organizations that are hosted in the multitenant platform.

14. The one or more non-transitory computer readable media as recited in claim 8, wherein the program of instructions is executable by the device to further perform:

generating bytecodes that enable high performance execution of operations and logics specified in the source code of the first high-level programming language.

15. A system, comprising:

one or more computing processors; and one or more non-transitory computer readable media storing a program of instructions that is executable by the one or more computing processors to perform:

identifying, in source code of a first high-level programming language to be transformed into source code of a second high-level programming language, a first source code portion that uses a particular standard data object name to reference and access a particular standard data object;

transforming the first source code portion in the source code of the first high-level programming language to a second source code portion in the source code of the second high-level programming language;

compiling the second source code portion in the source code of the second high-level programming language into a low-level code portion in low-level code, which when executed in a multitenant platform, causes runtime performance of:

identifying a specific organization from among a plurality of organizations that are hosted in the multitenant platform; and referencing and accessing a particular organization-specific instance of the particular standard data object among a plurality of organization-specific instances of the particular standard data object, wherein the plurality of organization-specific instances of the particular standard data object is provided by the multitenant platform to the plurality of organizations that are hosted in the multitenant platform, and wherein the particular organization-specific instance of the particular standard data object is provided by the multitenant platform to the specific organization from among the plurality of organizations that are hosted in the multitenant platform.

16. The system as recited in claim 15, wherein the first source code portion in the source code of the first high-level programming language is free of access control source code statements with respect to the particular standard data object, and wherein the second source code portion in the source code of the second high-level programming language is generated to include access control source code statements that control user access to the particular organization-specific instance of the particular standard data object.

17. The system as recited in claim 15, wherein the first source code portion in the source code of the first high-level programming language comprises a wildcard reference to all data fields in the particular standard data object, and wherein the second source code portion in the source code of the second high-level programming language determines a subset of data fields, accessible to a user at runtime, in the particular organization-specific instance of the particular standard data object.

18. The system as recited in claim 17, wherein the subset of data fields includes at least one of: a standard data field as provided by the multitenant platform, or a custom data field defined by the specific organization from among the plurality of organizations that are hosted in the multitenant platform.

19. The system as recited in claim 15, wherein the first source code portion in the source code of the first high-level programming language comprises a database statement for executing a database operation with respect to the particular standard data object.

20. The system as recited in claim 15, wherein the second source code portion in the source code of the second high-level programming language is generated to include source code statements to deploy a customer object in the specific organization from among the plurality of organizations that are hosted in the multitenant platform, and wherein the customer object is accessible to users in the specific organization from among the plurality of organizations that are hosted in the multitenant platform but not other users in other organizations from among the plurality of organizations that are hosted in the multitenant platform.

* * * * *